United States Patent [19]
Menegoli

[11] Patent Number: 5,866,998
[45] Date of Patent: Feb. 2, 1999

[54] CIRCUIT FOR IMPROVING BACK EMF DETECTION IN PULSE WIDTH MODULATION MODE

[75] Inventor: Paolo Menegoli, Milpitas, Calif.

[73] Assignee: STMicroelectronics, Inc., Carrollton, Tex.

[21] Appl. No.: 957,088

[22] Filed: Oct. 24, 1997

[51] Int. Cl.$^6$ .................................................. H02K 23/00
[52] U.S. Cl. .......................... 318/254; 318/439; 318/811
[58] Field of Search .................................. 318/254, 439, 318/138, 808–811; 388/811, 829

[56] References Cited

U.S. PATENT DOCUMENTS

| | | | |
|---|---|---|---|
| 5,448,149 | 9/1995 | Ehsani et al. | 318/701 |
| 5,517,095 | 5/1996 | Carobolante et al. | 318/254 |
| 5,691,856 | 11/1997 | Kardash | 360/73.03 |
| 5,767,654 | 6/1998 | Menegoli et al. | 318/811 |

*Primary Examiner*—Brian Sircus
*Attorney, Agent, or Firm*—Theodore E. Galanthay; Lisa K. Jorgenson

[57] ABSTRACT

A power-switched driver circuit for a disc drive that provides accurate back emf detection in PWM mode. In one embodiment, a power transistor is coupled between the low side drivers and ground. During the off time of a PWM cycle, all of the high side drivers are off and the current recirculates through two of the low side drivers. The power transistor is off. This disconnects the motor from ground and allows the voltage on the center tap of the motor to be about half of $V_{cc}$, which allows the back emf of the motor to be detected during the off time using a conventional comparator as the back emf approaches a zero crossing. During the on time of a PWM cycle, the power transistor is on.

In an alternative embodiment, a power transistor is coupled between the high side drivers and $V_{cc}$. During the off time of a PWM cycle, all of the low side drivers are turned off and the current recirculates through two of the high side drivers. The power transistor is off, disconnecting the motor from $V_{cc}$ and allowing the voltage on the center tap of the motor to be about half of $V_{cc}$. This enables the back emf of the motor to be detected during the off time using a conventional comparator as the back emf approaches a zero crossing.

27 Claims, 5 Drawing Sheets

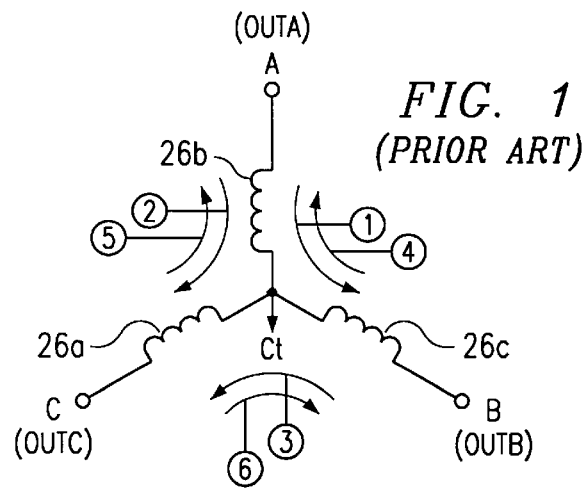
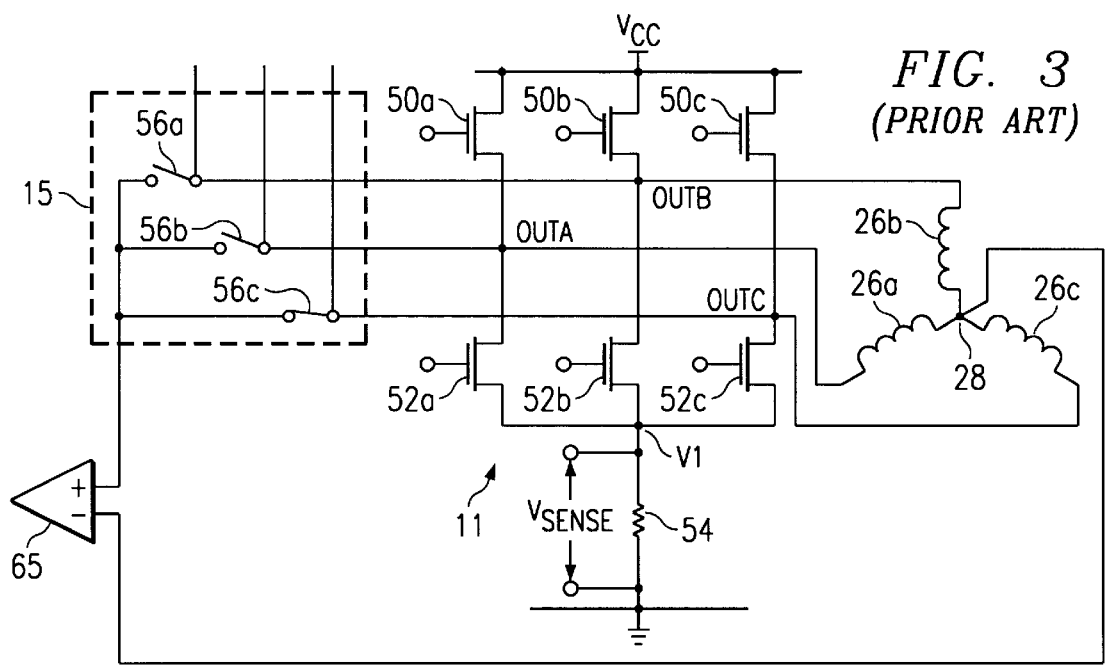
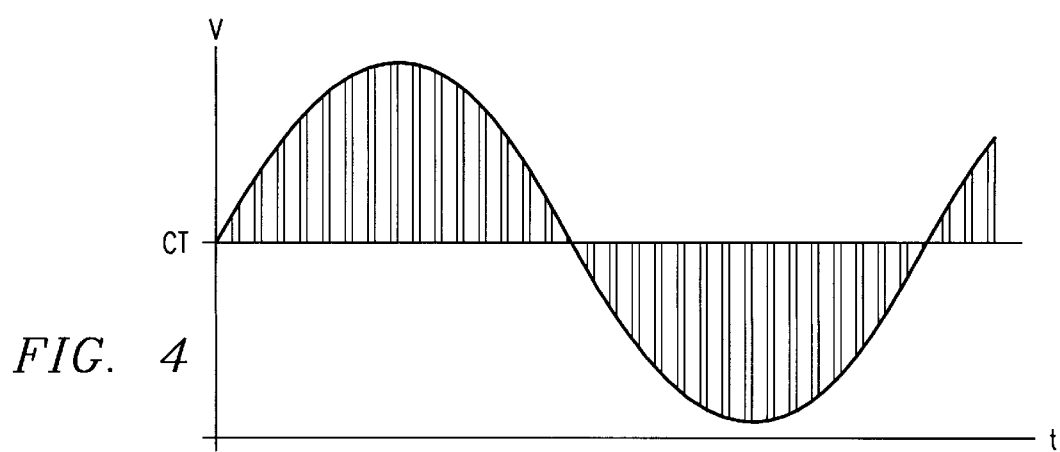

CIRCUIT FOR IMPROVING BACK EMF DETECTION IN PULSE WIDTH MODULATION MODE

BACKGROUND

The present invention relates to improvements in motor driving and control circuitry, and is more specifically related to an improved circuit and method for back electromotive force (emf) detection in a polyphase direct current (dc) motor, or the like.

Three phase dc motors, particularly brushless, sensorless, three phase dc motors, are popular in drives in information retrieval systems that use rotating recording media, such as discs. Conventional disc drives are used to both record and to retrieve information. As discs become more prevalent as the medium of choice for storing information in both computer and home entertainment equipment, disc drives likewise become more prevalent and important components of such electronic systems.

In addition to the recording media, a disc drive typically includes a read/write assembly and a spindle motor assembly. The read/write assembly is adapted to transfer data between the disc and an external system, or device, such as a microprocessor. The spindle motor assembly carries the information storage discs and is arranged to rotate the discs.

A conventional motor can be viewed as having three coils A, B, and C connected in a "Y" configuration, as shown in FIG. 1, although a larger number of stator coils are usually employed with multiple rotor poles. Typically, in such applications, eight pole motors are used having twelve stator windings and four N-S magnetic sets on the rotor, resulting in four electrical cycles per revolution of the rotor. The stator coils, however, can be analyzed in terms of three "Y" connected coils, connected in three sets of four coils, each physically separated by 90°.

During operation, coils A, B and C are energized with a drive signal that causes electromagnetic fields to develop about the coils. The resulting attraction/repulsion between the electromagnetic fields of the coils A, B, and C and the magnetic fields created by the magnets in the motor causes the rotor assembly of the motor to rotate. While rotating, the rotor assembly causes a back emf signal to be generated in the coils A, B and C due to the movement of the magnets in relation to the coils A, B and C.

The coils are energized in sequences to produce a current path through two coils of the "Y", with the third coil left floating, hereinafter floating coil FC. The sequences are arranged so that as the current paths are changed, or commutated, one of the coils of the current path is switched to float, and the previously floating coil is switched into the current path. The sequences are defined such that when the floating coil is switched into the current path, the direction of the current in the coil that was included in the prior current path is not changed. In this manner, six commutation sequences, or phases, are defined for each electrical cycle in a three phase motor, as shown in Table A.

TABLE A

| Phase | Current flows From: | To: | Floating Coil |
|---|---|---|---|
| 1 | A | B | C |
| 2 | A | C | B |
| 3 | B | C | A |
| 4 | B | A | C |
| 5 | C | A | B |
| 6 | C | B | A |

FIG. 2 shows a typical architecture of the motor 34 and a driver circuit 10 for driving the motor 34. Individual elements shown in FIG. 2 are suitably made in accordance with prior practice, as described in detail in U.S. Pat. Nos. 5,317,243 and 5,294,877 which are incorporated into this specification by reference. Specifically, the motor 34 consists of the stator 36 driven by the driver circuit 10. Although the driver circuit 10 can be constructed of discrete components, preferably, the driver circuit 10 is integrated onto a single semiconductor chip adapted for connection to the stator coils 26a, 26b, and 26c of a three phase dc brushless spindle motor. The stator coils 26a, 26b, and 26c are connected to output nodes OUTA, OUTB, OUTC and CT28. One end of each of the coils 26a, 26b, 26c is connected to the common center tap 28. The outer end is connected to one of the output nodes respectively designated, OUTA, OUTB, OUTC, which are connected to a power stage 11.

Referring to FIG. 3, a driving voltage is provided to the stator coils 26a, 26b, and 26c by the power stage 11, which is configured to have one high side driver 50a, 50b, 50c, and one low side driver 52a, 52b, 52c, for each of the stator coils 26a, 26b, and 26c. Referring again to FIG. 2, the power stage 11 is sequenced to provide sequential control output signals to the stator coils 26a, 26b, and 26c by a sequencer circuit 13. A signal interface circuit 12 supplies the output signals from the sequencer circuit 13 to the power stage 11, as well as enabling other functions, such as brake and output enable functions. The sequencer circuit 13 also provides drive signals to other circuits of the driver circuit 10 through sequence decode and output switches 15 to control the various aspects of rotation of the motor 34.

The stator coils 26a, 26b, and 26c are switchably connected to a back emf amplifier 14. The back emf amplifier 14 in turn delivers signals to a zero crossing detector 16, which provides input signals to a digital timing circuit 17. The output of the mask counter of the digital timing circuit 17 controls the operation of the sequencer circuit 13.

The driver circuit 10 includes system clock circuitry 23, phase lock loop (PLL) frequency/phase detector circuitry 24, a PWM drive 18 to support pulse width modulation operation mode of the motor, and may include various other circuitry, not shown, such as "align and go" start up circuitry to facilitate start up of the motor from a stopped condition, port control logic and associated shift register circuitry to facilitate control of the driver circuit 10 by an external microprocessor (not shown), and so forth.

The switching of the driver transistors of the power stage 11 to effect the switching currents for each phase is accomplished by the sequencer circuit 13. The sequencer circuit 13 provides signals to the high side drivers and the low side drivers to accomplish the switching sequence outlined above in Table A.

The commutation among the stator coils 26a, 26b, and 26c is performed in response to information indicating the specific position of the rotor 38 in conjunction with circuit information indicating the desired position of the rotor 38. More specifically, the commutation to apply the next drive sequence of Table A is determined in response to a corresponding coil reaching a particular rotational position and its correlation with sequencer information indicating where the motor 34 should be when a commutation is to occur. The determination of the precise rotational location of the rotor 38 is continuously being determined by monitoring the zero crossing voltage in each non-driven, or floating, stator coil. More particularly, as the stator coils 26a, 26b, and 26c are switched during the commutation sequence of the rotor 38, the voltage of the floating coil is monitored by the back emf amplifier 14.

During the operation of such a polyphase dc motor, maintaining a known position of the rotor 38 is an important concern. This can be implemented in various ways. One widely used way, for example, has been to start the motor in a known position, then derive information related to the instantaneous or current position of the rotor 38. Such instantaneous position information can be derived during the commutation process by identifying the floating coil and monitoring its back emf, that is, the emf induced into the coil as it moves through the magnetic field provided by the stator 36.

When the voltage of the floating coil crosses zero (referred to in the art as "a zero crossing"), the position of the rotor 38 is assumed to be known. Upon the occurrence of this event, the commutation sequence is incremented to the next phase, and the process repeated. The assumption that the zero crossing accurately indicates the rotor position is generally true if the motor 34 is functioning properly.

Referring again to FIG. 3, the sequence decode and output switches circuit 15 includes switches 56a, 56b, 56c connected to the stator coils 26a, 26b and 26c through the output nodes OUTA, OUTB, and OUTC to apply a selected one of the output nodes OUTA, OUTB, or OUTC (particularly the output node of the floating coil FC) to the non-inverting input of a comparator 65 in the back emf amplifier. The particular one of the output nodes OUTA, OUTB or OUTC which is applied to the comparator 65 corresponds to whichever of coils 26a, 26b, and 26c is expected to be floating (not the coil which is actually floating). Although the term "floating" is used herein to indicate the coil that is not in the instantaneous current path, the coil does not actually "float", but is connected to a tristate impedance. The center tap 28 of the stator is connected to the inverting input of the comparator 65, so that when the voltage on the selected floating coil becomes larger than the center tap voltage, the comparator changes states, representing the zero crossing of the voltage on the selected floating coil. When the voltage on the floating coil becomes smaller than the center tap voltage, the comparator again changes states, representing the zero crossing of the voltage on the selected floating coil. (The voltage on the floating coil is the so-called the back emf of the floating coil.) The comparator 65 is designed to have hysteresis, because the occurrence of a voltage beyond the zero crossing voltage may not last a sufficiently long time to enable the output signal of the comparator 65 to be useful.

A sense resistor 54 is coupled to between the low side drivers 52a, 52b, 52c and ground to control the current on the coils. The voltage on the sense resistor 54 is measured to determine the current on the coils 26a, 26b, 26c; if the current is too high the current is reduced and if it is too low it is increased.

Reducing the power consumed by the motor has long been a goal in the disc drive industry. One way to significantly reduce the power is to operate the motor in pulse width modulation (PWM) mode. The PWM mode is a nonlinear mode with discontinuities in application of drive current to the coils 26a, 26b, 26c. The power to the coils follows in the same overall pattern as in the linear mode but is chopped with alternating segments of on and off time as shown in FIG. 4. The frequency of on-off times in a PWM mode can typically vary from 25 kHz to 100 kHz. In a typical on-off cycle, lasting about 20 μs, there may be 14 μs of on time followed by 6 μs of off time.

In operation, during the on time of a PWM cycle, one output node, for example node OUTA, is driven high by one of the high side drivers 50a. One output node, for example node OUTB, is driven low by one of the low side drivers 52b. The third output node, for example node C, is left floating. This is commonly referred to as the "AB phase". The coils are then switched in a commutation sequence determined by the sequencer circuit 13 in a manner such that in each commutation phase current always flows in two of the three coils, with the third coil floating, and that after switching current will continue to flow, and in the same direction, in one of the two coils in which current was flowing in the previous phase to generate the six phases shown in Table A.

During the off time the high side driver 50a that was on is turned off and its corresponding low side driver 52a is turned on to recirculate the current flowing through the coils 26a, 26b. The low side driver 52b that was on during the on cycle, remains on. Almost all of the current will flow through the low side drivers 52a 52b and practically no current will flow through the sense resistor 54, bringing the voltage at node V1 to zero. This also brings the voltage on the center tap 28 to zero. When the voltage on the center tap 28 is zero, it very difficult to detect a zero crossing. The comparator 65 has to compare the voltage on the center tap, which is now zero, and the voltage on the floating coil as it approaches zero during a zero crossing. This would require the comparator 65 that is compatible to ground and has excellent common mode rejection, which requires a more complicated and expensive comparator.

Therefore, typically the voltage on the center tap 28 and the floating coil 26c is only compared during the on time, so the zero crossing is detected only during an on time. If the output of the comparator 65 toggles between on times there is a back emf zero crossing sometime in between. Therefore, there is a delay between the real zero crossing occurrence and the detection of the zero crossing.

This delay presents a problem because the delay could be up to the entire off time of a PWM cycle. The delay between the occurrence and the detection of the zero crossing is the time when the signal crosses the time axis until the next on time. The lower the PWM frequency the worse it will be. The delay in detecting the zero crossing produces jitter in the motor and disrupts the speed control of the motor, which can cause damage to both the disc, the head, and the drive components.

SUMMARY OF THE INVENTION

A driver circuit for detecting the back emf of a polyphase dc motor in PWM mode is produced in accordance with the present invention. The driver circuit has a PWM drive, a plurality of first drivers, and a plurality of second driver. Each of the first drivers has control input coupled to the PWM drive and a current path selectively connected between a first terminal of one of the coils of the motor and a first voltage source. Each of the second drivers has a current path selectively connected between a terminal of one of the coils of the motor and a second voltage source. The driver circuit also has a switch coupled between one of the second drivers and the second voltage source. The switch has a control input coupled to the PWM drive, for coupling and de-coupling the second driver from the second voltage source.

In accordance with the method of operation of the circuit of the present invention, when the motor is in the off time of the PWM mode, all of first drivers are turned off to disconnect the coils from the first current source. Two of the second drivers are turned on to form a loop for recirculating current. The switch is opened to disconnect the coils from the second current source. The back emf on the floating coil is then measured by comparing the voltage on the floating coil with the voltage on a center tap of the coils.

The novel features believed characteristic of the invention are set forth in the appended claims. The nature of the invention, however, as well as its features and advantages, may be understood more fully upon consideration of illustrative embodiments when read in conjunction with the accompanying drawings, wherein:

BRIEF DESCRIPTION OF THE DRAWINGS

FIG. 1 is a conventional representation of a "Y" configuration coil arrangement of a motor.

FIG. 3 is a circuit diagram of a portion of a motor and conventional driver circuit.

FIG. 4 are waveforms illustrating the back emf signal for the circuit of FIG. 3.

Parts common to FIGS. 1–7 are indicated using the same numbering system.

DETAILED DESCRIPTION OF THE PREFERRED EMBODIMENT

Figure 2:
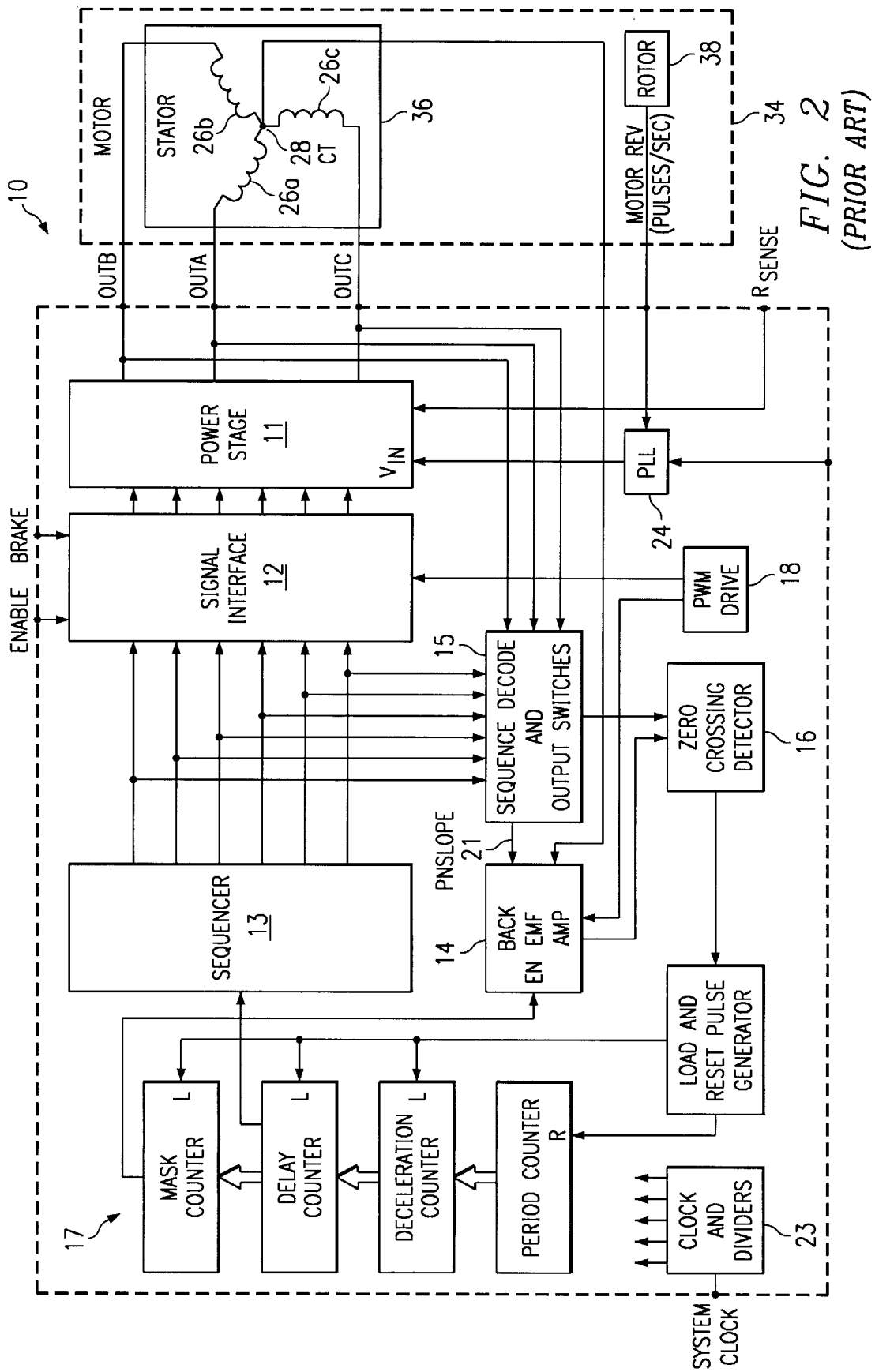
FIG. 2 is a circuit diagram, in block form, of a motor and conventional driver circuit.
Figure 5A:
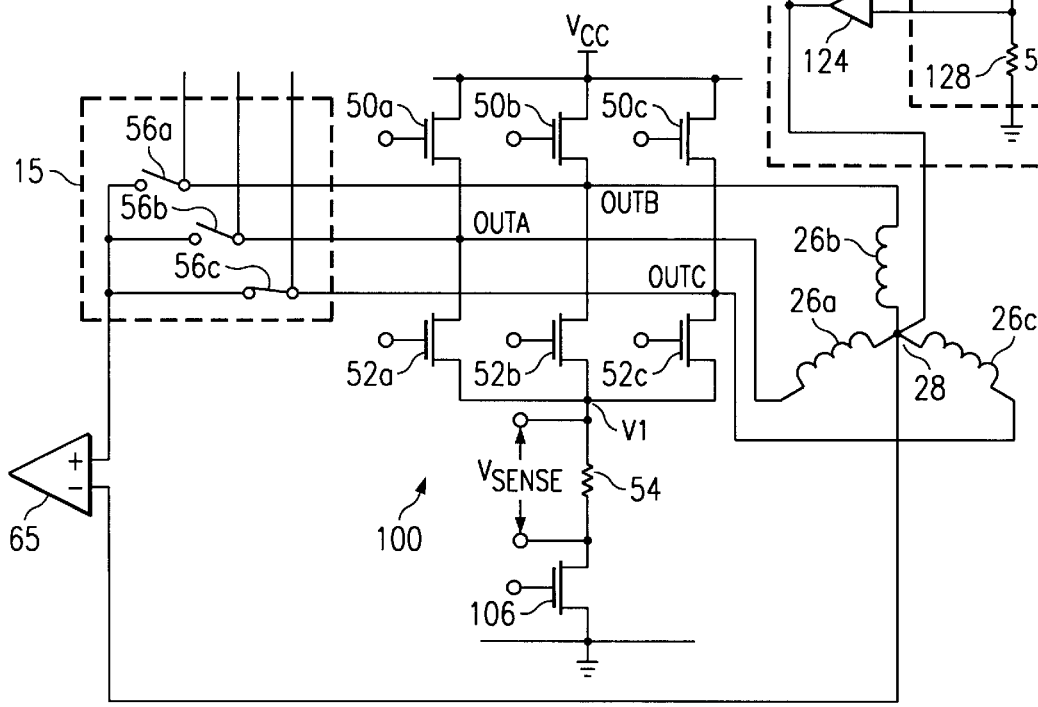
FIG. 5a is a circuit diagram of a portion of a motor and driver circuit according to an embodiment of the present invention including a sense resistor.
Figure 6:
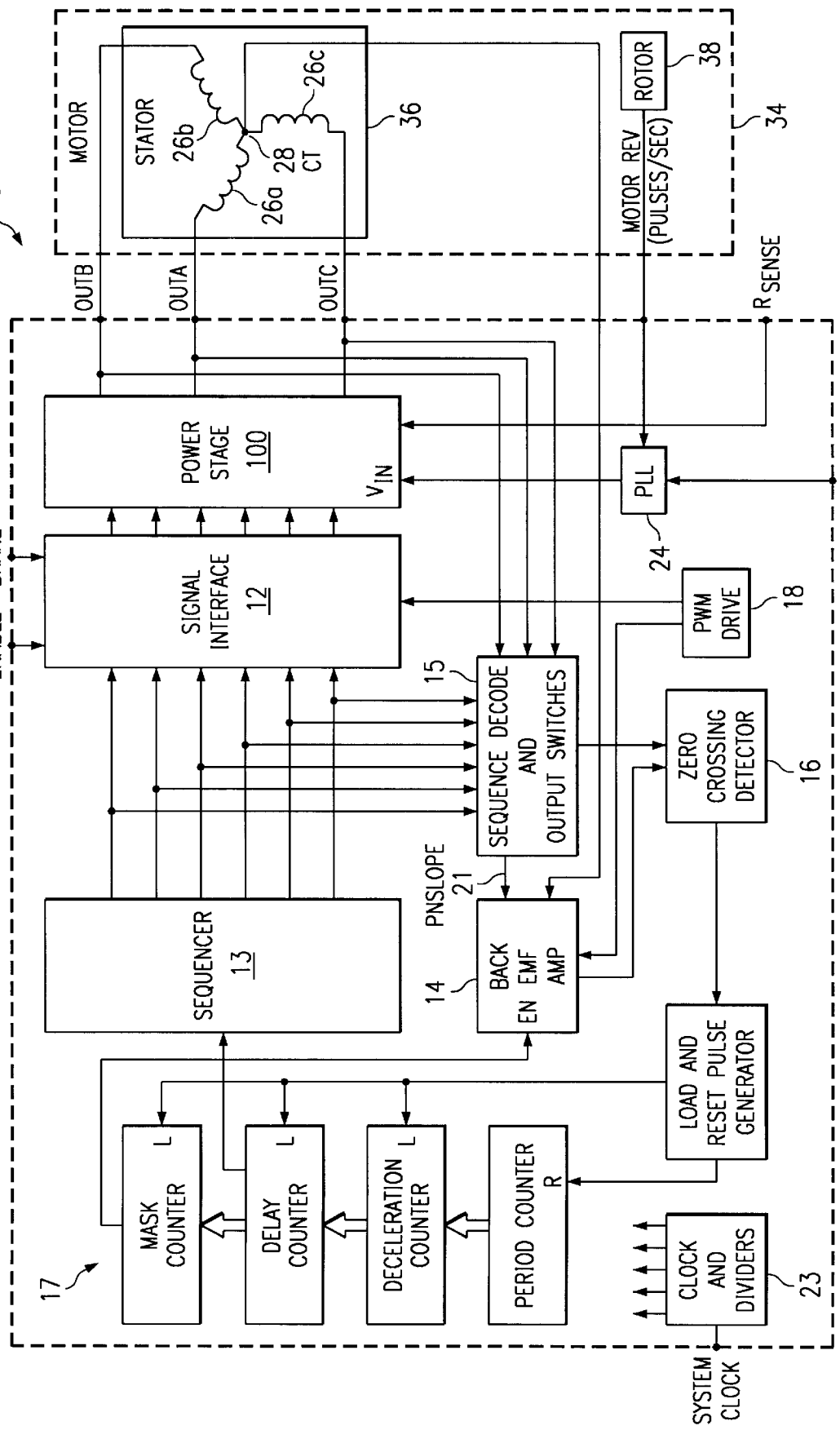
FIG. 6 is a circuit diagram, in block form, of a motor and motor driver circuit having a power stage according to an embodiment of the present invention.

Referring to FIG. 5a, a power stage according to an embodiment of the invention is designated generally by reference numeral 100. The power stage is typically included in a motor driver circuit 10' of a polyphase dc motor, as shown in FIG. 6.

The driver circuit 10' is like the conventional driver circuit 10 except for the power stage 100. The driver circuit 10' preferably is integrated onto a single semiconductor chip adapted for connection to the stator coils 26a, 26b, and 26c of a three phase dc brushless spindle motor 34, although the driver circuit 10' can be constructed of discrete components. The stator coils 26a, 26b, and 26c of the motor 34 are connected to output nodes OUTA, OUTB, OUTC and CT28. One end of each of the stator coils 26a, 26b, and 26c is connected to a common center tap 28. The other end is connected to respective output nodes OUTA, OUTB, and OUTC.

A driving voltage is provided to the stator coils 26a, 26b, and 26c by the power stage 100. The power stage 100 is sequenced to provide sequential control output signals to the stator coils 26a, 26b, and 26c by a sequencer circuit 13. A signal interface circuit 12 supplies the output signals from the sequencer circuit 13 to the power stage 100, as well as enabling other functions, such as brake and output enable functions. The sequencer circuit 13 also provides drive signals to other circuits of the controller circuitry to control the various aspects of rotation of the motor driven by the driver circuit 10' through sequence decode and output switches 15. The output node of the floating coil FC, such as output node OUTC when the phase is AB, is coupled to the back emf amplifier 14 through the sequence decode and output switches 15.

The driver circuit 10' includes system clock circuitry 23, phase lock loop (PLL) frequency/phase detector circuitry 24, a PWM drive 18 to support pulse width modulation operation of the motor, and may include various other circuitry, not shown, such as "align and go" start up circuitry to facilitate start up of the motor from a stopped condition, port control logic and associated shift register circuitry to facilitate control of the driver circuit 10' by an external microprocessor (not shown), and so forth.

The stator coils 26a, 26b, and 26c are switchably connected to a back emf sense amplifier 14, through output nodes OUTA, OUTB, and OUTC. The back emf amplifier 14 delivers signals to the zero crossing detector 16, which provides input signals to a digital timing circuit 17. The output of the mask counter of the digital timing circuit 17 controls the operation of the sequencer circuit 13.

The PWM drive 18 controls the power stage 100 to produce cycles of on and off time, with current supplied to the driven stator coils during the on time of the PWM cycle. The coils are driven by high and low side drivers in the power stage of the driver circuit 10' by selectively placing the coils into a current path between the power supplies of $V_{cc}$ and ground. The PWM drive 18 also produces a PWM chop signal, supplied to the power stage 100, signaling the start and end of the on and off times of each PWM cycle. The PWM chop signal is also supplied to the back emf amplifier 14.

Although FIG. 6 shows one embodiment of the driver circuit 10', any conventional driver circuit of a polyphase dc motor 34 that provides a power stage having a switch that can disconnect the coils from the power supplies during the off time of the PWM cycle can be used.

FIG. 5a shows the preferred power stage 100. The power stage has a plurality of first drivers each coupled between the first power source and one of the coils and a plurality of second drivers each coupled between the record power source and one of the coils. In this embodiment, the first drivers are high side drivers 50a, 50b, 50c and the second drivers are low side drivers 52a, 52b, 52c. The power stage has one high side driver 50a, 50b, 50c and one low side driver 52a, 52b, 52c for each of the stator coils 26a, 26b, and 26c, respectively. The high 50a, 50b, 50c and low 52a, 52b, 52c side drivers are typically power transistors. The source of each of the high side driver transistors 50a, 50b, 50c is connected to $V_{cc}$, the drain of each of the high side driver transistors 50a, 50b, 50c is connected to one of the coils 26a, 26b, 26c, respectively. The source of each of the low side driver transistors is connected to one of the coils 26a, 26b, 26c, respectively, the drain of each of the low side driver transistors 52a, 52b, 52c is coupled to a switch 106. The switch 106 is preferably a power transistor, and can be a sense FET, hereinafter switching transistor 106. A sense resistor 54 is connected between the low side driver transistors 52a, 52b, 52c and the switching transistor 106 to control the current on the coils. The voltage on the sense resistor 54 is measured to determine the current on the coils, if the current is too high the current is reduced and if it is too low it is increased. Alternatively the sense resistor 54 can be connected between the switching transistor 106 and ground. The switching transistor 100 can be external or it can be integrated into the IC containing the power circuit 10. However, since resistor 54 is coupled between the low side driver transistors 52a, 52b, 52c, the switching transistor 106 is external since the sense resistor 54 has to be an external component.

Figure 5B:
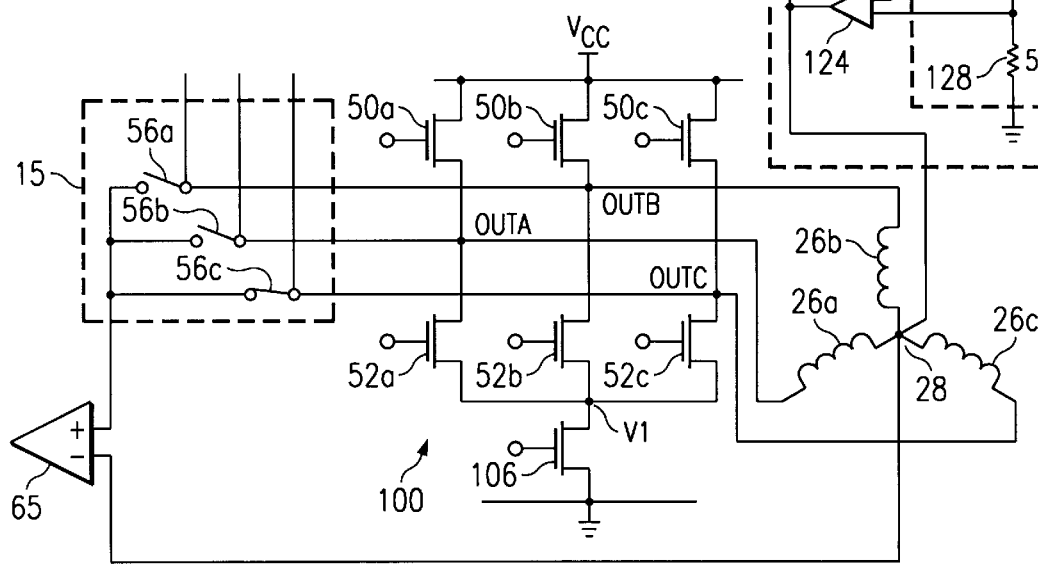
FIG. 5b is a circuit diagram of a portion of a motor and driver circuit according to an embodiment of the present invention not including a sense resistor.

In an alternative embodiment shown in FIG. 5b, the sense resistor is not present. Preferably, when the sense resistor is not present the switching transistor 106 is a sense FET and the $R_{DSON}$ of the transistor 106 is used as a sense resistor. Again, the switching transistor 106 can be external or integrated into the IC containing the power circuit 100.

Referring again to FIG. 5a, the switching of the high 50a, 50b, 50c and low 52a, 52b, 52c side driver transistors to effect the switching currents for each phase is accomplished by the sequencer circuit. The sequencer circuit provides signals to the gates of each of the high 50a, 50b, 50c and low 52a, 52b, 52c side driver transistors to accomplish the switching sequence outlined above in Table A. The gates of the high side driver transistors 50a, 50b, 50c are also coupled to the PWM drive to be able to turn off the high side driver transistors during the off time of the PWM cycle. The PWM drive is also coupled to the gate of the switching transistor 106 to be able to turn off the switching transistor when the high side driver transistors are off.

The output nodes OUTA, OUTB, OUTC off the coils 26a, 26b, 26c are selectively connected to a comparator 65 through switches 56a, 56b, and 56c. Particularly the output node of the floating coil is connected to the non-inverting input of comparator 65 in the back emf amplifier. The particular one of the output nodes OUTA, OUTB or OUTC which is applied to the comparator 65 corresponds to whichever of coils 26a, 26b, and 26c is expected to be floating (not the coil which is actually floating). The center tap connection 28 of the stator is connected to the inverting input of the comparator 65, so that when the voltage on the selected floating coil becomes larger than the center tap voltage, the comparator changes states, representing the zero crossing of the voltage on the selected floating coil. When the voltage on the floating coil becomes smaller than the center tap voltage, the comparator again changes states, representing the zero crossing of the voltage on the selected floating coil. The voltage on the floating coil is the back emf of the floating coil. The comparator 65 preferably has hysteresis, because the occurrence of a voltage beyond the zero crossing voltage may not last a sufficiently long time to enable the output signal of the comparator 65 to be useful.

Optionally a buffer 120 can be added to the power stage to drive the voltage at the center tap 28 to a predetermined voltage. The buffer preferably has voltage divider 122 connected between $V_{cc}$ and ground. The output of the voltage divider is the input of a unity gain op-amp 124, whose output is connected to the center tap 28 to drive the center tap voltage to the predetermined voltage. The ratio of the resistors 126, 128 of the voltage divider 122 determines the predetermined voltage, which is preferable about half of $V_{cc}$. The buffer 120 can be on continuously or can be switched on during the off periods of the PWM cycle and switched off during the on periods of the PWM cycle. This can be accomplished in any known manner, such as by turning the bias of the op-amp 124 off during the on time of the PWM cycle, or by adding a transistor at the output of the op-amp 124 and controlling the transistor in the same manner as the switching transistor 106. Typically, a conventional driver circuit will already contain such a buffer for other uses, therefore no additional circuitry is required.

In operation, during the on time of a PWM cycle, the PWM drive produces a first signal on the gate of one of the high side driver transistors, for example 50a, to turn on the high side driver transistor. This drives the output node OUTA high and energizes the associated coil 26a. The same signal also turns on the switching transistor 106. The PWM drive also produces a second signal on the gate of one of the low side driver transistors, for example 52b. This drives the output node OUTB low and energizes its associated coil 26b. The third output node, for example node OUTC, and its associated coil 26c, is left floating. The voltage on the center tap 28 and on the output node of floating coil OUTC, i.e. the back emf, is compared in the comparator 65. When the voltage on the floating coil becomes larger than the center tap voltage, the comparator changes states, representing the zero crossing of the voltage on the selected floating coil. When the voltage on the floating coil becomes smaller than the center tap voltage, the comparator again changes states, representing the zero crossing of the voltage on the floating coil.

During the off time the first signal is removed from the gate of the high side driver transistor 50a and applied to its corresponding low side driver transistor 52a, turning transistor 50a off and transistor 52a on, effectively turning off all of the high side driver transistors 50a, 50b, 50c. The low side driver transistor 52b that was on during the on cycle, remains on. The first signal is also removed from the switching 52b. However, now because the switching transistor 106 disconnected the coils from ground, the voltage on the center tap remains the same as it was during the on time, which is typically about half of $V_{cc}$. Optionally, to ensure that the voltage on the center tap 28 remains at the desired voltage a buffer can be added as described above. The voltage on the center tap 28 and on the output node of the floating coil 26c is compared in the comparator 65. Since the voltage on the center tap 28 remains about half of $V_{cc}$ a standard comparator 65 can be used to compare the center tap voltage and the back emf to determine the zero crossing. This allows a conventional comparator to monitor the motor during the off time of the PWM cycle to determine the zero crossing, resulting in better zero crossing detection, and therefore better operation of the motor, without a significant increase in the price of the driver circuit.

Figure 7:
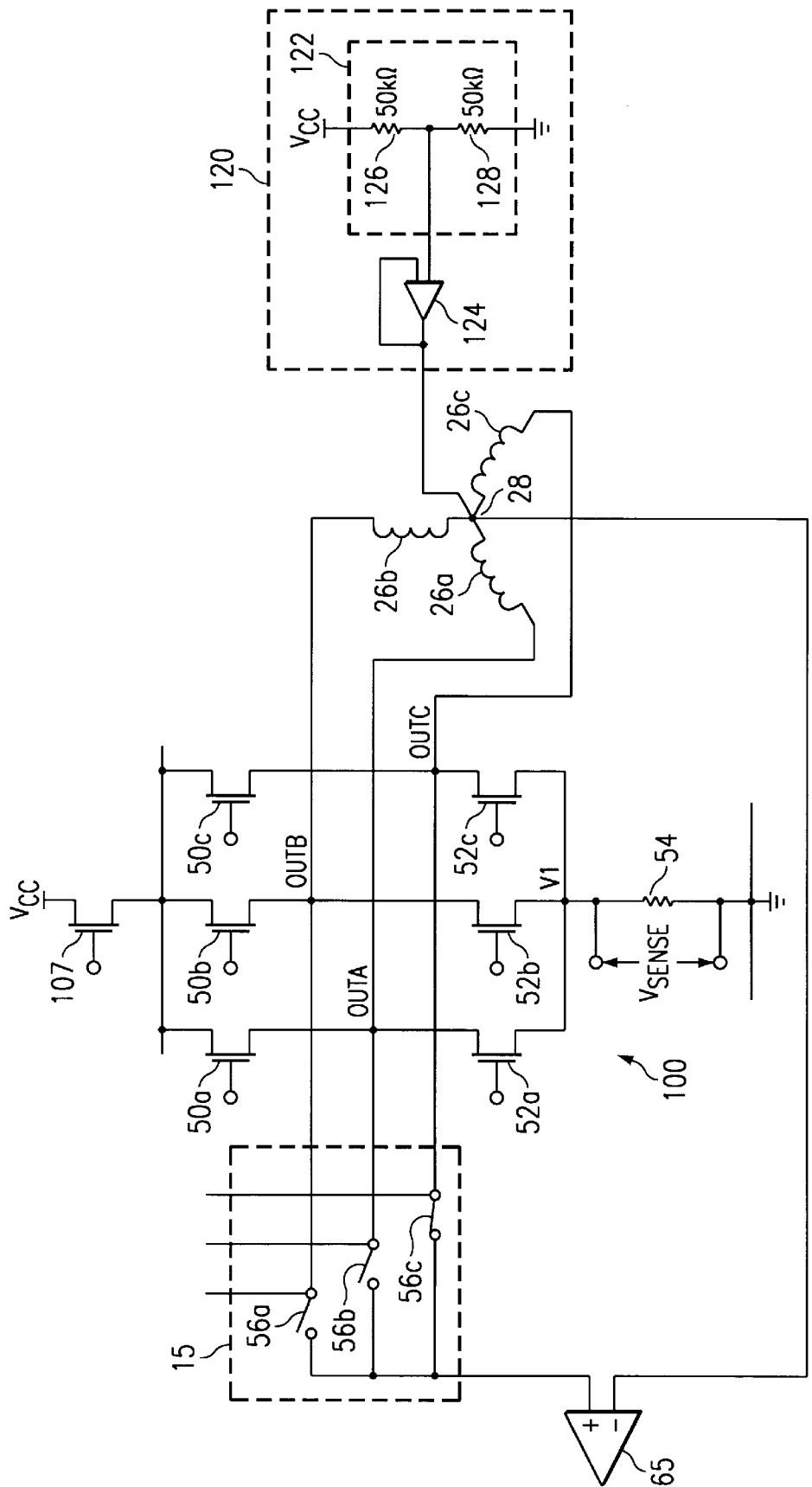
FIG. 7 is a circuit diagram of a portion of a motor and driver circuit according to another embodiment of the present invention.

FIG. 7 shows an alternative power stage 100' according to the present invention. In this embodiment, the first drivers are low side drivers 52a, 52b, 52c and the second drivers are high side drivers 50a, 50b, 50c. The power stage again has one high side driver 50a, 50b, 50c and one low side driver 52a, 52b, 52c for each of the stator coils 26a, 26b, and 26c, respectively. The high 50a, 50b, 50c and low 52a, 52b, 52c side drivers are typically power transistors. The drain of each of the high side driver transistors 50a, 50b, 50c is connected to one of the coils 26a, 26b, 26c, respectively, the source of each of the high side driver transistors 50a, 50b, 50c is connected to $V_{cc}$ through a switch 107. The switch 107 is preferably a power transistor, hereinafter switching transistor 107. The source of each of the low side driver transistors is connected to one of the coils 26a, 26b, 26c, respectively, the drain of each of the low side driver transistors 52a, 52b, 52c is connected to ground through a sense resistor 54.

The switching of the high 50a, 50b, 50c and low 52a, 52b, 52c side driver transistors to effect the switching currents for each phase, like in the previous embodiment, is accomplished by the sequencer circuit. The sequencer circuit provides signals to the gates of each of the high 50a, 50b, 50c and low 52a, 52b, 52c side driver transistors to accomplish the switching sequence outlined above in Table A. The gates of the low side driver transistors 52a, 52b, 52c are also coupled to the PWM drive to be able to turn off the low side driver transistors 5a, 50b, 50c during the off time of the PWM cycle. The PWM drive is also coupled to the gate of the switching transistor 107 to be able to turn off the switching transistor 107 when the low side driver transistors 52a, 52b, 52c are off.

The output nodes OUTA, OUTB, OUTC of the coils 26a, 26b, 26c are selectively connected to a comparator 65 through switches 56a, 56b, and 56c. Particularly the output node of the floating coil is connected to the non-inverting input of comparator 65 in the back emf amplifier. The center tap connection 28 is connected to the inverting input of the comparator 65, so that when the voltage on the selected floating coil becomes larger than the center tap voltage, the comparator changes states, representing the zero crossing of the voltage on the selected floating coil. When the voltage on the floating coil becomes smaller than the center tap voltage, the comparator again changes states, representing the zero crossing of the voltage on the selected floating coil. The comparator 65 preferably has hysteresis, because the occurrence of a voltage beyond the zero crossing voltage may not last a sufficiently long time to enable the output signal of the comparator 65 to be useful.

Optionally a buffer 120 can be added to the power stage to drive the voltage at the center tap 28 to a predetermined voltage. The buffer again preferably has voltage divider 122 connected between $V_{cc}$ and ground. The output of the voltage divider is the input of a unity gain op-amp 124, whose output is connected to the center tap 28 to drive the center tap voltage to the predetermined voltage. The ratio of the resistors 126, 128 of the voltage divider 122 determines the predetermined voltage, which is preferable about half of $V_{cc}$. Again, the buffer 120 can be switched on during the off periods of the PWM cycle and switched off during the on periods of the PWM cycle. This can be accomplished by turning the bias of the op-amp 124 off during the on time of the PWM cycle, or by adding a transistor at the output of the op-amp 124 and controlling the transistor in the same manner as the switching transistor 107.

In operation, during the on time of a PWM cycle the circuit operates in the same manner as the circuit in the embodiment in FIG. 5a. During the off time the second signal is removed from the gate of the low side driver transistor 52b and applied to its corresponding high side driver transistor 50b, turning transistor 52b off and transistor 50b on, thus, effectively turning off all of the low side driver transistors 52a, 52b, 52c. The high side driver transistor 50a that was on during the on cycle, remains on. The second signal is also removed from the switching transistor 107 turning off the switching transistor 107. The current flows through the two high side driver transistors 50a, 50b. However, now because the switching transistor 107 disconnected the coils from $V_{cc}$ the voltage on the center tap remains the same as it was during the on time, which is typically about half of $V_{cc}$. Optionally, to ensure that the voltage on the center tap remains at the desired voltage a buffer can be added as described above. The voltage on the center tap 28 and on the output node of floating coil 26c is compared in the comparator 65. Since the voltage on the center tap 28 remains about half of $V_{cc}$ a standard comparator 65 can be used to compare the center tap voltage and the back emf to a determine the zero crossing. This allows a conventional comparator to monitor the motor during the off time of the PWM cycle to determine the zero crossing.

A switching transistor that disconnects the coils from the power supply sources during the off time of the PWM cycle allows the back emf to be measured during the off time of the PWM cycle using a conventional comparator. Being able to use a conventional comparator to monitor the motor during the off time of the PWM cycle to determine the zero crossing permits better zero crossing detection without a significant increase in the cost of the driver circuit, a long standing goal in the disc drive industry. Better zero crossing detection reduces jitter in the motor and disruptions in the speed control of the motor, which can cause damage to the disc, the head, and the drive components. Thus, resulting in better operation of the motor, without a significant increase in the price of the driver circuit.

It should be noted that although a preferred embodiment of the invention is described with regard to a three phase motor, in particular, the principles of the invention can be equally advantageously applied to polyphase motors, in general.

Although the invention has been specifically described with reference to several preferred and alternative embodiments, it will be understood by those skilled in the art having reference to the current specification and drawings that various modifications may be made and further alternatives are possible without departing from the spirit and scope of the invention as set forth in the appended claims.

I claim:

1. A driver circuit for operating a polyphase direct current (dc) motor having a plurality of coils for selectively forming a current path between a first and second voltage sources, the driver circuit comprising:

a plurality of first drivers each having a current path selectively connected between a terminal of one of the coils and the first voltage source, and each having a control input for selecting the coil to form the current path;

a plurality of second drivers each having a current path selectively connected between a terminal of one of the coils and the second voltage source for selecting the coil to form the current path;

a switch having a control input for coupling and de-coupling the second driver from the second voltage source, the switch coupled between one of the second drivers and the second voltage source; and, a PWM drive for operating the motor in PWM mode, coupled to the control input of each of the first drivers and to the control input of the switch.

2. The driver circuit of claim 1, wherein:

each first driver comprises a high side driver transistor;
   each second driver comprises a low side driver transistor;
   the first voltage source comprises $V_{cc}$; and
   the second voltage source comprises ground.

3. The driver circuit of claim 2, further comprising a sense resistor coupled between the low side driver transistors and ground for determining the current on the coils.

4. The driver circuit of claim 1, wherein:

each first driver comprises a low side driver transistor;
   each second driver comprises a high side driver transistor;
   the first voltage source comprises ground; and
   the second voltage source comprises $V_{cc}$.

5. The driver circuit of claim 4, further comprising a sense resistor coupled between the low side driver transistors and ground for determining the current on the coils.

6. The driver circuit of claim, 1, wherein the motor further comprises a center tap, the driver circuit further comprising:
a comparator for comparing a voltage on one of the coils with the voltage on the center tap to determine a zero crossing, responsive to the coil not being in the current path, the comparator having an inverting input coupled to the center tap and a non-inverting input coupled to the coil.

7. The driver circuit of claim 1, wherein the switch comprises a power transistor.

8. The driver circuit of claim 1, wherein the switch comprises a sense FET.

9. A The driver circuit of claim 1, wherein the motor further comprises a center tap, the driver circuit further comprising a buffer for driving the voltage on the center tap to a predetermined voltage.

10. A driver circuit for operating a polyphase dc motor having a plurality of coils for selectively forming a current path between a first and second voltage sources, the driver circuit comprising:
a plurality of first drivers each having a current path selectively connected between a terminal of one of the coils and the first voltage source and each having a control input for selecting the coil to form the current path;
a plurality of second drivers each having a current path selectively connected between a terminal of one of the coils and the second voltage source for selecting the coil to form the current path;
a switching means for coupling and de-coupling the second drivers from the second voltage source, the switching means having a control input; and,
PWM drive for operating the motor in PWM mode, coupled to the control input of each of the first drivers and to the control input of the switching means.

11. The driver circuit of claim 10, wheren:
each first driver comprises a high side driver transistor;
each second driver comprises a low side driver transistor;
the first voltage source comprises $V_{cc}$; and
the second voltage source comprises ground; and
the driver circuit further comprises a sense resistor coupled between the low side driver transistors and ground for determining the current on the coils.

12. The driver circuit of claim 11, wherein:
each first driver comprises a low side driver transistor;
each second driver comprises a high side driver transistor;
the first voltage source comprises ground; and
the second voltage source comprises $V_{cc}$; and
the driver circuit comprises a sense resistor coupled between the low side driver transistors and ground for determining the current on the coils.

13. The driver circuit of claim, 11, wherein the motor further comprises a center tap, the driver circuit further comprising:
a comparator for comparing a voltage on one of the coils with the voltage on the center tap to determine a zero crossing, responsive to the coil not being in the current path, the comparator having an inverting input coupled to the center tap and a non-inverting input coupled to the coil.

14. The driver circuit of claim 11, wherein the switch comprises a power transistor.

15. The driver circuit of claim 11, wherein the switch comprises a sense FET.

16. The driver circuit of claim 11, wherein the motor further comprises a center tap, the driver circuit further comprising a buffer for driving the voltage on the center tap to a predetermined voltage.

17. A disc drive comprising:
a polyphase dc motor capable of operating in a PWM mode, the motor having a plurality of coils for selectively forming a current path between a first and second voltage sources and a center tap;
a driver circuit for driving the motor comprising:
a plurality of first drivers each having a current path selectively connected between a terminal of one of the coils and the first voltage source and each having a control input for selecting the coil to form the current path;
a plurality of second drivers each having a current path selectively connected between a terminal of one of the coils and the second voltage source for selecting the coil to form the current path;
a switch having a control input for coupling and de-coupling the second driver from the second voltage source, the switch coupled between one of the second drivers and the second voltage source; and,
PWM drive for operating the motor in PWM mode, coupled to the control input of each of the first drivers and to the control input of the switch.

18. The disc drive of claim 17, wherein:
each first driver comprises a high side driver transistor;
each second driver comprises a low side driver transistor;
the first voltage source comprises $V_{cc}$; and
the second voltage source comprises ground.

19. The driver circuit of claim 18, further comprising a sense resistor coupled between the low side driver transistors and ground for determining the current on the coils.

20. The disc drive of claim 17, wherein:
each first driver comprises a low side driver transistor;
each second driver comprises a high side driver transistor;
the first voltage source comprises ground; and
the second voltage source comprises $V_{cc}$.

21. The disc drive of claim 20, further comprising a sense resistor coupled between the low side driver transistors and ground for determining the current on the coils.

22. The disc drive of claim 17, further comprising:
a comparator for comparing a voltage on one of the coils with the voltage on the center tap to determine a zero crossing, responsive to the coil not being in the current path, the comparator having an inverting input coupled to the center tap and a non-inverting input coupled to the coil.

23. The disc drive of claim 17, wherein the switch comprises a power transistor.

24. The disc drive of claim 17, wherein the switch comprises a sense FET.

25. The disc drive of claim 17, further comprising a buffer for driving the voltage on the center tap to a predetermined voltage.

26. A method of measuring the back emf on a floating coil of a polyphase dc motor operating in PWM mode having an on and off time, the motor having a plurality of coils for selectively coupling to a first and second current sources driven by a driver circuit having a plurality of first and second drivers and a switch, comprising:
responsive to the motor being in the off time of the PWM mode:

turning off all the first drivers for disconnecting the coils from the first current source;

turning on two of the second drivers for forming a loop for recirculating current;

opening the switch for disconnecting the coils from the second current source; and measuring the back emf on the floating coil by comparing the voltage on the floating coil with the voltage on a center tap of the coils.

27. The method of claim 26, further comprising the steps of:

responsive to the motor being in the on time of the PWM mode:

turning on one of the first drivers for energizing one of the coils;

turning on one of the second drivers for energizing another one of the coils; and closing a switch for connecting the coils to a second current source;

wherein the above steps are performed prior to the step of measuring the back emf on the floating coil.

* * * * *